April 30, 1957 P. RAIBOURN 2,790,845
DOUBLE BINARY, CONSTANT LUMINANCE, COLOR TELEVISION SYSTEM
Filed June 30, 1953
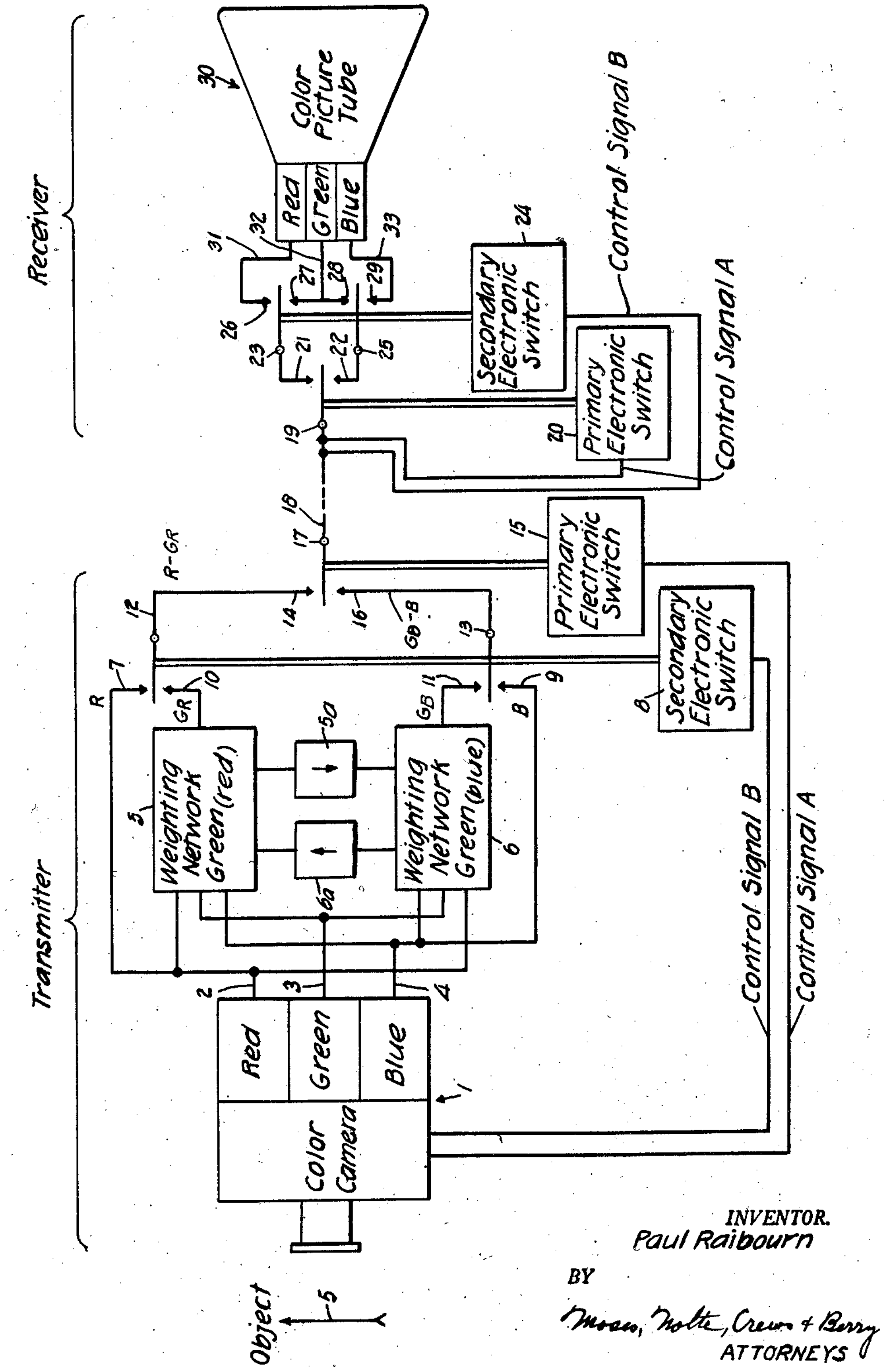
INVENTOR.
Paul Raibourn
BY
Mason, Nolte, Crews & Berry
ATTORNEYS 2,790,845

DOUBLE BINARY, CONSTANT LUMINANCE, COLOR TELEVISION SYSTEM

Paul Raibourn, Southport, Conn.

Application June 30, 1953, Serial No. 365,185

16 Claims. (Cl. 178—5.2)

The present invention relates to sequential color television systems in which the complete color sequence is determined by four signals which are so related that an apparent condition of constant luminance is obtained when the video signal is reproduced in accordance with the invention on a suitable display device.

Conventional sequential color television systems, although simple and inexpensive from an apparatus standpoint, have heretofore failed to become generally adopted because of the fact that they produce an objectionable flicker or tremulous shimmering effect if a repetition rate of display is used which is compatible with that used in the present black and white system. The present invention provides a system in which the economic advantages of sequential polychromatic systems are associated with simple switching methods made possible by the use of a four signal color system, thereby producing a system in which the luminance remains constant between sequential displays and high repetition rates are unnecessary for the purpose of avoiding objectionable flicker or shimmering effects in the reproduced display.

Resolution of polychromatic pictures into four component colors is well known in the art. In the present invention, the component colors used are so related to each other, or are so derived from a set of three color signals, that by a simple small area spatial association and suitable interrelation of the signal luminances, it is possible to obtain an apparent luminance of display for one pair of signals which is equal to the luminance of display for the other similarly associated pair of signals. This makes it possible to locate the complicated portion of the system at the transmitter, where a single installation is required, and to use receivers which approach the condition of being as simple and inexpensive as the usual black and white receivers.

Other methods of overcoming such flicker and shimmer have been proposed. An important one is that proposed by the National Television Systems Committee (hereinafter referred to as the NTSC). In this system, the totality of the three color signals is transmitted at a lower definition than the corresponding black and white signal would have been, and in the unused spectrum space, available because of this lowered definition, together with the space available from frequency interleaving of signals, there is conveyed to the receiver two additional signals specifying color information and which provide a basis for low definition analysis of the color signal. Since this analysis is at the receiver, it follows that the receiver has a large number of components, is complex and costly, and provides a low degree of color definition.

The present invention relates more particularly to sequential television systems utilizing a sequential switching of four signals derived from three component primary colors, such as red, green and blue, producing a resultant polychromatic image, by double binary switching means providing four sequential time intervals, one interval being provided for each of the four derived signals.

Two portions of a secondary switching means are alternately selected by a primary switching means. The primary and secondary switching means are provided both at the transmitter and at the receiver and are suitably interconnected either directly or through the transmitted signal to operate in synchronism at the transmitting and receiving terminals of the system.

The invention pertains more specifically to double binary trichromatic switching systems of this character in which the receiver comprises a cathode ray picture tube having a screen subdivided into elemental areas such as lines or dots. The elemental areas are divided into three groups, and the areas of each group are coated with a suitable phosphor either with or without an associated filter for producing for each of the areas a variable light energy having the chromaticity of one of the three primary colors, red, green and blue. The elemental areas of each group are so positioned with respect to each other that a particular one of the three primary colors may be individually selected for display at the position of each element of the reproduced polychromatic image. Picture tubes of this type are well known in the art, and any desired type may be used.

The double binary switching system of the present invention, when applied to a trichromatic color system provides constant luminance, and color definition at least as high as presently proposed by the NTSC, and greatly simplifies the receiving apparatus, particularly with respect to the switching apparatus which converts the chrominance information contained in the received signal into the selection of a particular one of the three component primary colors for display on the viewing screen at the receiver.

A description of the NTSC's system of color television is published in the February 1952 issue of "Electronics" at pages 88 to 95, and this system is hereinafter referred to as the NTSC system. A description of a transmitting terminal for the NTSC system appears in the March 1953 issue of "Communication and Electronics" published by the American Institute of Electrical Engineers, 33 West 39th Street, New York.

The simplification provided by the present invention is made possible by the fact that binary electronic switching elements such as trigger circuits, flip-flop circuits and other similar circuits which merely switch an input signal to either of two output circuits are both simple and inexpensive. Moreover, such switching elements are readily susceptible of pulse synchronization and offer numerous other advantages as compared to other types of electronic switching devices. For example, such a switching element is used as a keying separator and is described in the April 1953 issue of "Electronics" in connection with a video insert system at pages 150–153. For use with the present invention, the electronic switching means at the receiver may be greatly simplified, however.

A simple binary or double-throw switching circuit is shown in the December 1952 issue of "Electronics" at pages 122–123, illustrating an arrangement for providing a D.-C. reference indication on the screen of a cathode ray tube used for laboratory purposes. Numerous simple switching circuits having appropriate characteristics are known in the art, and any desired type may be used.

An object of the invention is to provide a trichromatic television system in which the total luminance of the transmitted signal, when integrated over such areas as might cause noticeable flicker, remains constant and is not altered by the accompanying chrominance information, thereby permitting the video signal to be correctly reproduced by a conventional monochrome or black-and-white receiver without objectionable flicker or other undesirable effects.

An additional object of the invention is the provision of a color television system which will permit the conversion of any present standard black-and-white receiver for monochrome pictures into a receiver for trichromatic color pictures by simple and inexpensive modifications involving only the replacement of the picture tube and the addition of a highly simplified color control switching circuit.

A further object of the invention is the provision of a trichromatic constant luminance television system in which the trichromatic color switching is accomplished entirely by binary switching elements, no modulated chrominance sub-carrier being required.

Another object of the invention is to provide a trichromatic switching system in which the complete color switching cycle comprises four time intervals of equal average duration for each picture element, two of the time intervals being used for one of the three primary color signals and each of the other two intervals being used for only one of the other two color signals, so that two of the time intervals are common to one of the three component primary color signals.

A further object of the invention is to provide different chromatic weightings for the common color signal during each of its two time intervals in the switching cycle, whereby chromatic distortion is prevented and constant luminance is maintained.

Other and further objects and advantages of the invention will become apparent upon reading the following specification together with the accompanying drawing forming a part hereof.

In the NTSC system, the specified trichromatic color signals are so proportioned, that for a reference white signal corresponding to the absence of any chrominance, the standard color triangle coordinates are $x$:0.310, $y$:0.316.

These, and other requirements for the system are given in field test specifications published in the January 1952 issue of "Electronics" at pages 126 and 127. A recent revision was approved for publication on February 2, 1953, by the Editorial Committee of the National Television System Committee, and appears in Television Digest, Supplement No. 75–A, dated February 14, 1953.

The system of the present invention, however, uses a novel double binary method and apparatus for impressing the chrominance information on the transmitted signal, which method and apparatus differ from those of the NTSC system and result in marked simplification of the circuits at each receiver, producing a standard 525 line picture without exceeding the bandwidth requirement and other similar requirements of the Standard Authorized Federal Communications Commission television signal.

Primary colors having the following chromaticities are specified for the NTSC system and are suitable for use in practicing the invention, the $x$ and $y$ coordinates being given with reference to the CIE system of specification:

| Primary Color | Color Triangle Coordinates | |
|---|---|---|
| | $x$ | $y$ |
| Red (R) | 0.67 | 0.33 |
| Green (G) | 0.21 | 0.71 |
| Blue (B) | 0.14 | 0.08 |

The actual colors corresponding to these coordinates may be viewed in a standard color triangle published, for example, in Philips Technical Review, November 1950, vol. 12, No. 5, opposite page 140.

The above chromaticities have been selected by way of example only, and are the present values which are currently specified for the NTSC system as being obtainable with accuracy, using commercially available materials for the camera filters and the picture tube phosphors.

The system of the present invention may be practiced using a set of four similarly selected component primary colors, if desired, instead of the three primary colors specified above.

At the transmitter, the transmitted polychromatic signal of the present invention utilizes four equal time intervals for the sequential transmission of the chrominance information, one pair of time intervals forming one half of the double binary transmission of two of the three color signals and the other pair of time intervals forming the other half of the double binary transmission during which a color signal common to the previous half and the third color signal are transmitted.

At the receiver, there are only three primary colors available for display. Accordingly, I prefer to display the green phosphor during two of the four sequential time intervals and the red and the blue phosphors each during only one of four time intervals. This double duration for the display of the green phosphor would obviously double its luminance and thereby distort the chrominance of the reproduced polychromatic image.

Accordingly, the invention comprises the provision of means at the transmitter for so weighting the luminance components of each of the two green signals that this distortion is corrected, and that the luminance of the green phosphor at the receiver during the two intervals is so modified that chrominance distortion is avoided, notwithstanding the double display of green. Each of the two transmitted green signals is further individually modified with components of the red and blue camera output signals so that the correct total luminance for each combined element of the image is obtained in a conventional black-and-white receiver, notwithstanding the double duration of the green signal.

Referring to the drawing, the single figure is a diagrammatic representation showing the double binary switching elements and chromatic weighting networks of the invention, the conventional portions of the television system having been omitted for simplicity of illustration.

Referring to the drawing, a color camera designated generally as 1 is shown provided with three primary color output circuits 2, 3 and 4, one for each of the primary colors red, green and blue, respectively. For purposes of illustration, it is assumed that the chromaticities of these primary colors are those set forth in table given above for the NTSC system.

Appropriate weighting and gamma correction networks for each primary color are provided within the camera 1, so that if the color of an object 5 before the camera is a white having the chromaticity coordinates in the CIE system of $x$:0.310, $y$:0.316, then the three outputs from camera 1 will have the relative luminances whose total luminance or monochrome signal equivalent is 1.00. The luminance coefficients, as in the NTSC system, are for:

*White $x$:0.310, $y$:0.316*

| Primary Color | Coefficient |
|---|---|
| Red | 0.30 |
| Green | 0.59 |
| Blue | 0.11 |
| Total | 1.00 |

The color camera 1 is conventional and may be of the type described in the December 1949 issue of "Electronics" in the article on color television appearing at pages 66–71. A camera of this type simultaneously produces three separate signals, one for each of the three primary colors red, green and blue.

The Red camera signal output circuit 2 is connected to a Green(red) signal weighting network 5, a Green(blue) signal weighting network 6, and to an input circuit 7 of a secondary electronic switch 8.

The Green camera signal output circuit 3 is connected only to the input of the $Green_{(red)}$ weighting network 5 and the $Green_{(blue)}$ weighting network 6.

The Blue camera signal output circuit 3 is connected to the weighting networks 5 and 6 and to an input circuit 9 of secondary electronic switch 8.

The $Green_{(red)}$ weighting network 5, instead of passing the Green signal with its luminance coefficient of 0.59, modifies this signal and combines therewith certain components of the other two signals. The output from the weighting network 21 provides a $Green_{(red)}$ signal consisting of the following:

*Green(red)*

| | Signal | Luminance |
|---|---|---|
| Green | .500 | .295 |
| Red | −.254 | −.15 (deducted) |
| Blue | .093 | .055 |
| Total | .339 | .200 |

Total luminance (signal x .59) = .200.

Adding the camera-weighted red luminance coefficient of 0.30 to the $Green_{(red)}$ total luminance coefficient of .20, the total luminance during secondary switching between Red and $Green_{(red)}$ is .50, or half of the total luminance of 1.00.

The weighting provided by the $Green_{(blue)}$ network 6 is arranged to give the following signal coefficients:

*Green(blue)*

| | Signal | Luminance |
|---|---|---|
| Green | .50 | .295 |
| Red | .254 | .15 |
| Blue | −.093 | −.055 (deducted) |
| Total | .661 | .390 |

Adding the camera-weighted luminance coefficient of the Blue signal of .11 to the $Green_{(blue)}$ luminance coefficient of .390, the luminance during secondary switching between Blue and $Green_{(blue)}$ is .50 as in the case of the secondary Red-$Green_{(red)}$ switching.

It should be noted that each of the luminance coefficients in the $Green_{(red)}$ and $Green_{(blue)}$ signals is one-half the numerical value of its camera-weighted luminance coefficient for the reference chromaticity of white. Thus, .295 is one-half of .59 for Green; .15 is one-half of .30 for Red; and .055 is one-half of .11 for Blue.

In both the $Green_{(red)}$ and $Green_{(blue)}$ signals, one-half of the camera weighted Green signal is present. Thus, the total luminance of the green phosphor during the $Green_{(red)}$ and $Green_{(blue)}$ signals is correctly weighted. The increased luminance of one-half the Blue signal which is added to the $Green_{(red)}$ signal is deducted from the $Green_{(blue)}$ signal so that its overall effect on the $Green_{(blue)}$ and $Green_{(red)}$ signals is zero. Similarly, the one-half of the Red signal luminance which is added to the $Green_{(blue)}$ signal is deducted from the $Green_{(red)}$ signal so that its overall effect on the $Green_{(red)}$ and $Green_{(blue)}$ signals is likewise zero. This is described in greater detail below.

The $Green_{(red)}$ and $Green_{(blue)}$ signals are derived from weighting networks 5 and 6, respectively, which combine all three camera output signals and which may conveniently comprise resistance networks and amplifiers to prevent undesired coupling among the three color signals. The weighting networks 5 and 6 are further so arranged that no negative signal can appear at the output of either network, since such a signal would indicate a condition of blacker than black, thus being confused with the conventional vertical and horizontal synchronizing pulses.

It will be noted from the two tables given above, that there are possible conditions where the $Green_{(red)}$ and $Green_{(blue)}$ signals may become negative. To maintain the correct total luminance, the supplementary networks *5a* and *6a* are provided. These networks comprise rectifiers or other polarity sensitive devices and are so arranged that when the $Green_{(red)}$ signal becomes negative, this negative value is deducted from the $Green_{(blue)}$ signal, and vice versa.

The deduction of the Red signal component in the case of the $Green_{(red)}$ signal and deduction of the Blue signal component, in the case of the $Green_{(blue)}$ signal may be effected in conventional manner by appropriately poled connections in the resistance networks, or a phase inverter may be used if desired.

The output of the $Green_{(red)}$ weighting network 5 is connected to an input circuit 10 of secondary switch 8 and the output of $Green_{(blue)}$ weighting network 6 is connected to an input circuit 11 of secondary switch 8.

Secondary electronic switch 8 alternately connects its two input circuits 7 and 10 to common output circuit 12 and alternately connects its two input circuits 11 and 9 to a common output circuit 13.

Output circuit 12 of secondary switch 8 is connected to an input circuit 14 of a primary electronic switch 15 and output circuit 13 of secondary switch 8 is connected to an input circuit 16 of primary switch 15. Primary switch 15 alternately connects its two input circuits 14 and 16 to a common output circuit 17.

A transmission device 18, which may be a conventional television transmitter, a coaxial line, or other means for conveying the transmitted signal to the receiver, is connected to the output circuit 17 of primary switch 15.

At the receiver, the transmission device which may be a conventional monochrome receiver, has its output connected to an input circuit 19 of a primary electronic switch 20 having two output circuits 21 and 22. Primary switch 20 at the receiver operates in synchronism with the primary switch 15 at the transmitter and alternately connects its input circuit 19 to one or the other of its two output circuits 21 and 22.

The output circuit 21 of primary switch 20 is connected to one of the input circuits 23 of a secondary electronic switch 24. The other output circuit 25 of primary switch 20 is connected to the other input circuit 25 of secondary switch 24.

Secondary switch 24 is provided with four output circuits 26, 27, 28 and 29 which are connected to a trichromatic display device shown as a tricolor picture tube 30, having color control circuits 31, 32 and 33.

Secondary switch output circuit 26 is connected to the Red signal control circuit 31 of tube 30; the two output circuits 27 and 28 are both connected to the Green control circuit 32; and the output circuit 29 is connected to the Blue control circuit 33. Secondary switch 24 at the receiver operates in synchronism with the secondary switch 8 at the transmitter.

The trichromatic display device 30 with its three control circuits 31, 32 and 33 is arranged to select a particular one of its red, green and blue phosphors, respectively, for display at each elemental picture area with a luminance determined by one or more control electrodes within the tube, such as a grid for example.

The display device 30 may take the form of three separate tubes or a three gun tube of conventional RCA type. I prefer, however, to use a trichromatic picture tube of the type disclosed in the application of Ernest O. Lawrence, Serial No. 219,213, filed April 4, 1951, now Patent No. 2,692,532, granted October 26, 1954. A color television receiver using the Lawrence trichromatic picture tube is shown and described in my copending application, Serial No. 313,251, filed October 6, 1952.

A first control signal "A," derived from the horizontal and vertical synchronizing signals or scanning potentials of camera 1, causes the primary transmitting electronic switch 15 to select either the Red-$Green_{(red)}$ pair of color outputs, or to select the Blue-$Green_{(blue)}$ pair of color outputs for transmission to the receiver. Primary electronic switch 20 at the receiver operates in synchronism with the primary switch 15 at the transmitter, the synchronization being accomplished by any desired conventional means.

The secondary electronic switch 8 selects between Red and Green(red) in its upper portion and between Green(blue) and Blue in its lower portion. Secondary switch 24 at the receiver is synchronized with secondary switch 8 at the transmitter, the switching sequence being determined by a control signal "B" derived from the synchronizing signals or scanning potentials of the camera 1.

As previously noted, from a luminance standpoint, the Green(red) and Green(blue) coefficients each consists numerically of ½ the Green coefficient of .59 or .295; ½ the Red coefficient of .30, or .15; and ½ the Blue coefficient of .11, or .055. During Red-Green(red) secondary switching, in order to avoid overemphasis of the Red signal, the Red signal is deducted from the Green(red) signal with which it alternates. Since the Blue signal is omitted during this period, its luminance coefficient is added. This brings the total luminance from a monochromatic standpoint to its correct total value of .50, and, integrated over such areas as cause flicker to be seen, no monochromatic contrast distortion is introduced in a conventional black-and-white receiver.

Similarly, during Blue secondary switching, the Blue signal is deducted and the Red signal is added to maintain constant total luminance and similarly thereby preserve the monochromatic contrast balance.

If the coefficients of the Green(red) and Green(blue) signals are added, the total is Green .59 which is its proper luminance coefficient to obtain the specified color coordinates for the white. The Blue and Red signals cancel out when the two Green signals are added together, since their algebraic signs are opposite in each of the two Green signals. Considering the total of the four signal intervals which have equal average values, this total gives the correct coefficients to obtain the specified white with color coordinates of $x$:0.310 and $y$:0.316. The luminance is proportional to the total luminance over two and over four switching intervals and the accompanying weighting of the color signals, but the luminance and chrominance information is transmitted and reproduced without distortion.

The synchronous primary and secondary switching could be effected in conventional manner by separate control channels if desired, but it is desirable for practical purposes that the switching system of the present invention be conveniently adaptable to the present day standards of television transmission.

In conforming the switching system of the present invention to the standards established for the NTSC system, I may advantageously control the primary switches 15 and 20 by the "burst" signal which follows each horizontal blanking and synchronizing pulse, including within the primary switches 15 and 20 a suitable flip-flop circuit so that the first line of the first field is scanned with Red-Green(red) secondary switching and the next line of the field, which is the third line of the frame, is scanned with the Blue-Green(blue) secondary switching. The "burst" signal may also be utilized to bring the secondary switches to a predetermined initial position at the beginning of each line, field and frame so that the switching at the receiver will be synchronized with that at the transmitter in a line by line fashion.

Alternatively, the vertical blanking pulse may be used to control the primary switching in a field by field manner.

Conveniently, I may control the secondary switching by a suitable odd harmonic of one-half the line frequency, such as the 3.56 megacycle chrominance subcarrier of the NTSC system, although not necessarily the same odd harmonic. Since all harmonics of the line frequency up to a high order are present within the 6 megacycle bandwidth, a suitable local oscillator at the receiver may be controlled by the received signal to produce the desired odd harmonic of one-half the line frequency, and this may be used for control of the secondary switching. By proper selection of the primary and secondary switching patterns, the odd picture lines scanned during the first field may be scanned Red-Green(red) and the even picture lines scanned during the second field scanned with Green(blue)-Blue, reversing the sequence with the first field of the next frame to scan the odd picture lines with Green(blue)-Blue and the even picture lines with Red-Green(red).

Other switching sequences and control frequencies may be used, provided only that each picture element both at the transmitter and at the receiver is scanned both synchronously and sequentially with Red-Green(red) and Blue-Green(blue) in such a manner that in the course of four complete frames every element of the picture will have been scanned once with each of the four trichromatic color signals.

In one variant of those doubly sequential constant luminance systems possible with these signals, a first line will be transmitted with a signal consisting of a sequence of Red and Green(red) information with a frequency of alternation between the two which is an odd number of times one-half the line frequency as is the chrominance sub-carrier in the NTSC system. The frequency of this alternation could be the same as the frequency of the NTSC sub-carriers but is not necessarily the same. Since any such first line will be an even line in its next repetition Red will replace Green(red) at those points where Green(red) was shown during the first line and vice-versa.

If all the lines of the first field are transmitted in Red (R) and Green(red) sequential and all the lines of the second field in Blue (B) and Green(blue) the luminance definition will be similar vertically to the luminance definition of the black-and-white signal and when two frames are completed the luminance is also constant in the horizontal direction and all small area change is removed.

It will be observed that the color definition available from the foregoing set of proposals is ½ of the black-and-white luminance definition rather than ⅓ or ⅙ as furnished by the Q and I channel bandwidths of the NTSC proposals.

For example, if a low primary switching frequency of one-half the line frequency (7875 cycles) is used in conjunction with a high frequency of secondary switching, then a sequential constant luminance effect is obtained between alternate lines because of the conventional interlaced scanning pattern.

It is apparent that line by line or frame by frame switching from Red-Green(red) to Blue-Green(blue) is possible as well as field by field switching as proposed above. Line crawl and frame flicker is avoided since the luminance is constant no matter what method or time of switching between the two color sequences is used.

It is even possible to switch between lines in a random manner or to use a frequency of switching between Red-Green(red) and Blue-Green(blue) which is prime both to the line rate per second (15,750) and its factors. If done at a frequency per second which is prime and in the neighborhood of 100,000 no flicker will be seen at any point of change since luminance is constant between Red-Green(red) and Blue-Green(blue).

It is an important characteristic of the switching system of the present invention, that no particular sequence need be followed so long as synchronous switching is maintained at the transmitting and receiving terminals of the system, and provided further that each elemental picture area is scanned sufficiently rapidly with all four color transmission signals to prevent flicker and to preserve the monochrome characteristics of the overall signal.

The following is an example of a line sequential method of scanning according to the present invention.

| Line in space | Line in Time | Frame 1 | | Frame 2 | | Frame 3 | | Frame 4 | |
|---|---|---|---|---|---|---|---|---|---|
| | | Field 1 | Field 2 | Field 1 | Field 2 | Field 1 | Field 2 | Field 1 | Field 2 |
| 1 | 1 | R | | B | | $G_R$ | | $G_B$ | |
| 2 | 264 | | $G_B$ | | R | | B | | $G_R$ |
| 3 | 2 | B | | $G_R$ | | $G_B$ | | R | |
| 4 | 265 | | R | | B | | $G_R$ | | $G_B$ |
| 5 | 3 | $G_R$ | | $G_B$ | | R | | B | |
| 6 | 266 | | B | | $G_R$ | | $G_B$ | | R |
| 7 | 4 | $G_B$ | | R | | B | | $G_R$ | |
| 8 | 267 | | $G_R$ | | $G_B$ | | R | | B |
| 9 | 5 | R | | B | | $G_R$ | | $G_B$ | |
| 10 | 268 | | $G_B$ | | R | | B | | $G_R$ |
| 11 | 6 | B | | $G_R$ | | $G_B$ | | R | |

In the above example, the signal is to transmitted that each line is successively scanned with Red, Blue, Green$_{(red)}$ and Green$_{(blue)}$ in the sequence indicated. The constant luminance characteristic of this scanning pattern is clearly apparent from a study of the example set forth.

An advantage derived from the use of the above scanning pattern is the fact that "pairing of lines," which is one of the most common faults in ordinary receivers, will increase the constancy of luminance instead of impairing this desirable characteristic.

It is also possible to switch at a frequency which is an odd number of (for instance seven) times the line frequency. Such a switching rate will reverse the color from Red-Green$_{(red)}$ to Blue-Green$_{(blue)}$ or vice-versa each successive time the line is traveled over.

In switching from Red to Green$_{(red)}$ or from Blue to Green$_{(blue)}$ it will be observed that the change has a first and fundamental Fourier frequency component which is the switching frequency. Therefore, if there is any change other than in the levels in either case it is possible to constantly derive the switching frequency from the transmitted signal and it is unnecessary to send any synchronizing signal with it. Such a constant synchronizing signal will totally disappear only when white is being transmitted and when white is being transmitted such a synchronizing signal is unimportant as white will be produced by equal energy of the components no matter if the local receiver switching frequency is slightly off its correct frequency. Furthermore, the amount of the synchronizing signal becomes less and less as the luminance increases and as the signal tends toward the white level where signal interference might be noticeable and becomes large only at those points where luminance is low.

It will be observed that because of this feature of having a continuous high frequency synchronizing signal available the phase of this signal and resultant color effects can be reversed at the transmitter as desired with lines, fields, or frames and the possible combinations of systems are extensively increased.

The total luminance for the Green$_{(red)}$ signal becomes negative and unusable when $.15R$ exceeds $.295G+.055B$. At that point no Green signal is associated with the Red signal and the entire Green signal is in the Blue-Green$_{(blue)}$ areas. The points where this condition arises are points well down in the lower right hand corner of the CIE diagram where Red is by far the predominant color and hue variations with relative light level is high, often as much as 50 millimicrons of the spectrum in dominant color with a ratio of brilliance of ten to one. Furthermore, it is a well known property of the Red phosphors which would be dominantly used for presentation of such colors that they are less likely, because of their decay characteristics, to produce the sensation of flicker than are the other phosphors. Thus, even though the formula becomes inoperative at that point and some nonconstancy of luminance can exist, flicker will not be observed even under extreme conditions.

Theoretically a similar condition could exist for a very small area where the blue phosphor predominates, but the characteristics of the best of the blue phosphors in use viz. the amount of white in them, are such as to minimize this effect.

As a further advantage of the present invention, it should be noted that in a tube such as the Lawrence tube, the power necessary to produce the high frequency grid switching of color can be reduced to from ten to 25% of that otherwise required. This arises because the major portion of this switching, i. e. from the Green-Blue boundary to the Red-Blue boundary would be done only at low frequencies, preferably line, field, or frame frequency and it would not be necessary to have high frequency power of more than five percent except to overcome errors in the accuracy of the Green-Blue or of the Green-Red boundaries in their relation to their associated grid wires.

The invention is particularly suitable for use with a "Lawrence" tube as described in the application of Ernest O. Lawrence, Serial No. 219,213, filed April 4, 1951. For example, with a two-gun tube of this type, Red-Green$_{(red)}$ secondary switching may be carried out using one of the two guns and the Blue-Green$_{(blue)}$ switching carried out using the other gun. In this manner the primary switching involves merely the selection of one of the two guns and the secondary switching requires only a potential change on the focusing electrode which is adjacent to the trichromatic screen.

The specific means used for effecting synchronization between the switches at the transmitter and at the receiver is not a part of the present invention, and as previously noted, separate control channels may be used for primary control signal "A" and secondary control signal "B."

While I have shown but one embodiment of my invention, I do not wish to be confined to the embodiment shown, but what I desire to cover by Letters Patent is set forth in the appended claims.

What is claimed is:

1. The method of transmitting a constant luminance trichromatic television signal comprising three primary color signals, which when combined with predetermined relative coefficients of luminance produce a white signal of reference chromaticity, comprising the steps of: transmitting a first one of the signals during a first interval; transmitting a second one of the signals during a second interval; transmitting the third one of said signals during a third interval and during a fourth interval; sequentially spatially in display associating said third interval with said first interval; sequentially in display associating said second interval with said fourth interval; diminshing said third signal by one-half during said third and fourth intervals; diminishing said third signal by that proportion of said first signal which when multiplied by the coefficient of luminance of said third signal is equal to one-half of the coefficient of said first signal and augmenting said third signal by that proportion of said second signal which when multiplied by the coefficient of luminance of said third signal is equal to one-half of the coefficient of said second signal during said third interval; and diminishing said third signal by that proportion of said second signal which when multiplied by the coefficient of luminance of said third signal is equal to one-half of the coefficient of said second signal and augmenting said third signal by that proportion of said first signal which when multiplied by the coefficient of luminance of said third signal is equal to one-half of the coefficient of said first signal, whereby the total luminance of said transmitted signals during said four intervals is equal to the luminance of the total of said three primary color signals.

2. The method of transmitting a constant luminance trichromatic television signal comprising three primary color signals, which when combined with predetermined relative coefficients of luminance produce a white signal of reference chromaticity, comprising the steps of: transmitting a first one of the signals during a first interval; transmitting a second one of the signals during a second interval; transmitting the third one of said signals during a third interval and during a fourth interval; sequentially associating said third interval with said first interval; sequentially associating said second interval with said fourth interval; causing all of said intervals to be of equal average duration; diminishing said third signal by one-half during said third and fourth intervals; diminishing said third signal by one-half the coefficient of said first signal and augmenting said third signal by one-half the coefficient of said second signal during said third interval; and diminishing said third signal by one-half the coefficient of said second signal and augmenting said third signal by one-half the coefficient of said first signal during said fourth interval, whereby the total luminance of said transmitted signals during said four intervals is equal to one-half of the total of said predetermined coefficients.

3. The method of transmitting and reproducing a polychromatic television image of an object by means of a television signal, while maintaining the monochromatic characteristics of said image in said signal, comprising the steps of: scanning an image of said object and simultaneously generating three primary color signals of identical phase therefrom, each of said three color signals having a magnitude determined by the brightness of said objects at each of three primary colors, said three color signals when combined, producing a white signal of predetermined reference chromaticity when their relative magnitudes are proportional to three coefficients R, G and B, respectively, the sum of said coefficients being unity; weighting a first one of said signals in proportion to the coefficient R to form a first transmission signal; combining all three color signals using components thereof having the luminance proportions ½ $(G-R+B)$ to form a second transmission signal; combining all three signals using components thereof having the luminance proportions ½ $(G+R-B)$ to form a third transmission signal; and weighting a second one of said color signals in proportion to the coefficient B to form a fourth transmission signal; transmitting said four transmission signals in predetermined sequence during four time intervals of equal average duration; and reproducing said polychromatic image by producing light of the chromaticity of one of each of said three primary colors at each elemental picture area of a display device in positional synchronism with said scanning; and sequentially controlling the magnitude of said light display in synchronism with said transmission signals, said primary color proportional to R being displayed during transmission of said first transmission signal, said primary color proportional to G being displayed during the transmission of said second and third transmission signals, and said primary color proportional to B being displayed during the transmission of said fourth transmission signal, said predetermined sequence being arranged to provide successive sequential display under control of one of each of said four transmission signals at each of said elemental picture areas.

4. The method according to claim 3, in which said color signals are generated with magnitudes determined by the brightness of said object at the three primary colors: red, green and blue; and wherein said coefficients R, G, and B apply respectively to said primary colors in the order named.

5. The method according to claim 4, wherein the standard color triangle chromaticity coordinates of said three primary colors are selected to be substantially:

| | x | y |
|---|---|---|
| Red | 0.67 | 0.33 |
| Green | 0.21 | 0.71 |
| Blue | 0.14 | 0.08 |

and in which the numerical values of said coefficients are selected to be substantially

| | |
|---|---|
| R | 0.30 |
| G | 0.59 |
| B | 0.11 |

the chromaticity coordinates of said reference white signal being selected to be substantially $x$:0.310, $y$:0.316.

6. The method of reproducing the polychromatic image of an object from a transmitted constant luminance trichromatic television signal of the image of said object, said transmitted signal having been derived by scanning an image of said object and simultaneously generating three primary color signals of identical phase therefrom, each of said three color signals having a magnitude determined by the brightness of said object at each of three primary colors, said three color signals when combined, producing a white signal of predetermined reference chromaticity when their relative magnitudes are proportional to three coefficients R, G and B, respectively, the sum of said coefficients being unity; a first one of said signals having been weighted in proportion to the coefficient R to form a first transmission signal; all three color signals having been combined using components thereof having the proportions ½ $(G-R+B)$ to form a second transmission signal; all three color signals having been combined using components thereof proportional to ½ $(G+R-B)$ to form a third transmission signal, and a second one of said color signals having been weighted in proportion to the coefficient B to form a fourth transmission signal, said four transmission signals having been transmitted in predetermined sequence during four time intervals of equal average duration, said reproducing method comprising the steps of: producing light of the chromaticity of one of each of said three primary colors at each elemental picture area of a display device in positional synchronism with said scanning; and sequentially controlling the magnitude of said light display in synchronism with said transmission signals, said primary color proportional to R being displayed during transmission of said first transmission signal, said primary color proportional to G being displayed during the transmission of said second and third transmission signals, and said primary color proportional to B being displayed during the transmission of said fourth transmission signal, said predetermined sequence being arranged to provide successive sequential display under control of one of each of said four transmission signals at each of said elemental picture areas.

7. The method according to claim 5, in which said color signals are generated with magnitudes determined by the brightness of said object at the three primary colors: red, green and blue; and wherein said coefficients R, G, and B apply respectively to said primary colors in the order named.

8. The method according to claim 7, wherein the standard color triangle chromaticity coordinates of said three primary colors are selected to be substantially:

| | x | y |
|---|---|---|
| Red | 0.67 | 0.33 |
| Green | 0.21 | 0.71 |
| Blue | 0.14 | 0.08 |

and in which the numerical values of said coefficients are selected to be substantially.

| | |
|---|---|
| R | 0.30 |
| G | 0.59 |
| B | 0.11 |

the chromaticity coordinates of said reference white signal being selected to be substantially $x$:0.310, $y$:0.316.

9. The method of transmitting a trichromatic color television signal consisting of three primary color signals, comprising the steps of: changing the set of three signals into a derived set of four transmission signals, said four derived signals having, when applied to the three corresponding primary color reproducing elements of a trichromatic display device, the same total luminance as said three primary color signals when applied individually to the corresponding reproducing elements of the same display device; said four transmission signals being sequentially associated in pairs, the two associated transmission signals of each pair having a total luminance equal to the total luminance of the two transmission signals of the other pair; and transmitting said four transmission signals in chronologically arranged equal time sequences, said four transmission signals being so derived that each of the two associated transmission signals of each pair represents a chromatic and positional scanning of contiguous elemental picture areas.

10. A trichromatic television system of the class described, comprising: trichromatic camera means for deriving three synchronously scanned video signals, each signal having an instantaneous amplitude determined by the luminance of one of three primary colors in an elemental picture area of the scene being scanned, said video signals having relative amplitudes proportioned to produce a reference chromaticity of white when said three video signals are successively applied for equal short intervals to the three corresponding color reproducing elements of a trichromatic display device; a first weighting network means for combining said three video signals to derive a first auxiliary transmission signal having, when combined with a first one of said three video signals, an instantaneous luminance amplitude equal to one-half of the total instantaneous luminance amplitude of said three video signals; a second weighting network means for combining said three video signals to derive a second auxiliary transmission signal having, when combined with a second one of said three video signals, an instantaneous luminance amplitude equal to one-half the total instantaneous luminance amplitude of said three video signals; switching means for selectively transmitting said first video signal, said first auxiliary transmission signal, said second auxiliary transmission signal, and said second video signal; means for receiving said transmitted signals; a trichromatic display device; and switching means connected intermediate said receiving means and said display device and synchronized with said first named switching means for applying said first video signal, when received, to display the corresponding one of said primary colors of said display device, and for applying said second video signal, when received, to display the corresponding one of said primary colors of said display device, and for applying said auxiliary transmission signals, when received, to display the third one of said primary colors.

11. In a polychromatic television system of the class described, in combination with transmitting means, and receiving means responsive to said transmitting means, said receiving means comprising a polychromatic display device having a picture reproducing means subdivided into a large number of elemental picture areas and means for selectively producing luminance of one of a plurality of predetermined chromaticities at each of said elemental areas, and a separate control input for each of said chromaticities, the provision of: means operatively associated with said transmitting means for simultaneously producing a plurality of pairs of synchronous chromatically weighted video signals corresponding to the same scene as viewed from a common point; secondary switching means operatively associated with said transmitting means for alternately selecting either of the two signals of each pair; primary switching means connected to said secondary switching means for selecting the signal of one of said pairs selected by said primary switching means for transmission by said secondary switching means for transmission by said transmitting means; further primary switching means operatively associated with said receiving means and operating in synchronism with said first named primary switching means for alternately directing the received signal into one of a plurality of signal paths; further secondary switching means comprising a portion for each of said signal paths and operating in synchronism with said first named secondary switching means for directing the signal from the one of said signal paths selected by said further primary switching means to one of said control inputs of said polychromatic display device.

12. The combination according to claim 11, in which said means operatively associated with said transmitting means is constructed and arranged to produce two pairs of weighted video signals.

13. The combination according to claim 11, in which said means operatively associated with said transmitting means comprises weighting means connected to modify the two signals of each pair to produce a condition of constant luminance when the two signals of the pair are successively and substantially simultaneously applied to two different control inputs of displaying device for the display of substantially the same elemental picture area.

14. A receiver for a polychromatic television system in which the transmitted polychromatic signal to be received comprises a plurality of pairs of individually chromatically weighted video signals transmitted in timed succession and all corresponding to the same scene as viewed from a common point, said receiver comprising in combination, receiving means responsive to the transmitted signal for deriving said video signals therefrom; primary switching means connected to said receiving means and operative in synchronism with said transmitted signal to select in timed succession the two signals of each pair; a polychromatic display device having a plurality of separate inputs each for selecting a particular color of the colors for which said transmitted signal is weighted to be displayed at any elemental picture area of said device; and secondary switching means connected to said primary switching means and to said display device, said secondary switching means being operative in synchronism with said transmitted signal to select one or the other of the individual signals of the pair of signals selected by said primary switching means and to apply the selected individual signal to the particular one of said display device inputs corresponding to the color for which said individual signal is weighted.

15. A receiver according to claim 14, wherein said transmitted signal comprises two pairs of individually weighted signals, said primary switching means comprising means for selecting either of said two pairs of signals for further selection by said secondary switching means and said secondary switching means comprising means for selecting each of the individually weighted signals from either of the pairs selected by said primary switching means.

16. A receiver according to claim 15, wherein said polychromatic display device is a trichromatic device having three separate inputs, one of said inputs being doubly connected to said secondary switching means to have two of said individually weighted signals applied thereto at different times.

References Cited in the file of this patent

UNITED STATES PATENTS

| | | |
|---|---|---|
| 2,586,825 | Jacobsen | Feb. 26, 1952 |
| 2,595,617 | Toulon | May 6, 1952 |